United States Patent Office 3,813,410
Patented May 28, 1974

3,813,410
7-AZA-6,8-DIOXA-BICYCLO-3,2,1-OCTANE
Werner Heimberger, Hanau (Main), and Wolfgang Weigert, Offenbach am Main, Germany, assignors to Deutsche Gold- und Silber-Scheideanstalt vormals Roessler, Frankfurt am Main, Germany
No Drawing. Filed June 3, 1970, Ser. No. 43,236
Claims priority, application Germany, June 3, 1969, P 19 28 264.5
Int. Cl. C07d 85/06
U.S. Cl. 260—307 F                    1 Claim

ABSTRACT OF THE DISCLOSURE

There are prepared glutaraldehyde monooximes of the tautomeric forms.

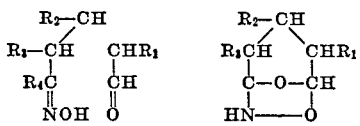

Where $R_1$, $R_2$, $R_3$, and $R_4$, are the same or different and are hydrogen, alkyl of 1 to 6 carbon atoms, $-CH(OR_5)_2$ $-CN$, $-CONH_2$ and $-COOR_6$ where $R_5$ and $R_6$ are hydrogen or alkyl of 1 to 6 carbon atoms.

It is known to react glutaraldehyde (glutardialdehyde) in aqueous solution with hydroxylamine hydrochloride in the molar proportions of 1:2 to form the corresponding dioxime, (Berichte 44, 2533).

The production of the corresponding monooxime has not yet been described.

The present invention is directed to the production of glutaraldehyde monooxime and its derivatives having the tautomeric forms of the general formulae (a)        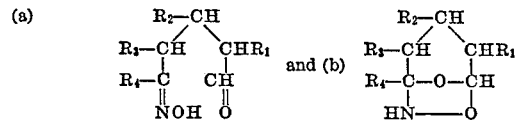       and (b)

in which $R_1$, $R_2$, $R_3$, and $R_4$, are the same or different and are hydrogen or alkyl of 1 to 6 carbon atoms or the group $-CH(OR_5)_2$, $-CN$, $-CONH_2$, or $-COOR_6$ where $R_5$ and $R_6$ are hydrogen or alkyl of 1 to 6 carbon atoms. The two tautomeric forms (a) and (b) exist together in an aqueous solution, tautomeric form (b) also exists as a solid.

These compounds can be produced by reacting glutaraldehyde or the indicated derivative in aqueous solution with a hydroxylamine salt in the molar proportion of 1:1, and the solution neutralized or preferably the reaction can be carried out in the presence of the calculated amount of an acid acceptor.

Suitable hydroxylamine salts include for example hydroxylamine hydrochloride, hydroxylamine hydrobromide, hydroxylamine iodide, hydroxylamine sulfate and hydroxylamine acetate.

The reaction is accordingly carried out so that per mole of dialdehyde only one mole of hydroxylamine salt is added. It is recommended that both reactants be added in the form of their aqueous solutions and the solution of the hydroxylamine be dropped into the solution of dialdehyde with the quickest possible dispersion. The acid set free from the hydroxylamine must either subsequently or, preferably, immediately be neutralized. This can be accomplished by adding the calculated amount of acid acceptor. As neutralizing agents or acid acceptors there can be used bicarbonates, for example alkali bicarbonates such as sodium bicarbonate, and potassium bicarbonate, carbonates, e.g. sodium carbonate, potassium carbonate and magnesium carbonate, metal oxides, for example magnesium oxide or calcium oxide, alkali acetates, for example sodium acetate and potassium acetate, or organic bases, especially tertiary bases, e.g. trimethyl amine, triethyl amine, tributyl amine, N,N-dimethyl aniline.

It is advantageous to maintain the pH between about 5 and about 7 during the reaction.

The monoöxime precipitates from the reaction solution after standing for several hours. It can be worked up by conventional methods.

The glutaraldehyde monoxide produced by this process is a white, crystalline solid. It melts at 169 to 171° C. when completely pure and has a mixed melting point with glutaraldehyde dioxime of 140 to 145° C. Its molecular weight obtained by mass spectrometry is 115. The monooxime can be converted into the known dioxime by addition of a further mole of a hydroxylamine salt while setting free of an equivalent of acid. It can also be converted with 2,4-dinitrophenyl-hydrazine into glutaraldehyde-1-monooxime-(2,4-dinitrophenyl)-5-hydrazone.

The above described reactions are only possible with intact aldehyde functions. This form of the monooxime is available in solution. On the other hand the IR and nuclear resonance spectra show that the compounds of the present invention in the crystalline state are present in the tautometric ring structure. Thus while both tautomeric forms of glutaraldehyde monoxime exist together in solution only form (b) can be isolated as a crystalline material.

The starting materials necessary for the process of the present invention can be produced according to a Diels-Alder reaction from, in a given case substituted vinyl ethers and acrolein or α,β unsaturated carbonyl compounds and converted into the corresponding dialdehydes by hydrolysis with dilute mineral acids, e.g. hydrochloric acid and sulfuric acid, see German Pat. 944,250.

The monooximes of the present invention are useful not only in preparing the corresponding dioximes but they are also useful as intermediates in the production of pyridine and pyridine derivatives.

Also they can be employed as bactericides, e.g. to kill E. coli. Furthermore they can be reduced to the corresponding amino alcohol, e.g. 1-aminopentanol-5.

Unless otherwise indicated all parts and percentages are by weight.

EXAMPLE 128 grams (1 mole) of 2-ethoxy-3,4-dihydropyrane were stirred in 400 ml. of 3% aqueous hydrochloric acid at 50° C. for about 45 minutes whereupon a clear solution of glutaraldehyde was obtained.

The solution of glutaraldehyde was cooled to 35° C. and slowly 111.6 grams (1.33 mole) of sodium bicarbonate were added and 69.5 grams (1 mole) hydroxylamine hydrochloride in 250 ml. of water were added to the solution with stirring at this temperature within 60 minutes.

Subsequently the solution was filtered and the filtrate freed in a vacuum of the alcohol arising from the hydrolysis of the 2-ethoxy-3,4-dihydropyrane. Upon standing overnight the bicyclic monooxime of glutaraldehyde crystallized out. The pure white product was filtered off with suction, washed with water and then with a mixture of chloroform and ether (1:1 by volume) to remove traces of the dioxime and dried.

There were obtained 88 grams (76.5% of theory) of glutaraldehyde monooxime with a melting point of 165 to 168° C. After recrystallisation from water the melting point was 170 to 171° C.

The elemental analysis of the glutaraldehyde monooxime is:

| | Percent | | |
|---|---|---|---|
| | C | H | N |
| Calculated | 52.10 | 7.81 | 12.19 |
| Found | 52.14 | 7.88 | 12.08 |

2.3 grams of the crystalline monooxime were dissolved in 25 ml. of perchloric acid and this solution added at room temperature to a solution of 4 grams of 2,4-dinitrophenyl-hydrazine in 25 ml. of perchloric acid. After a short period of standing the hydrazone crystallized out. It was removed by filtration with suction, washed neutral with water and dried. Yield 4.3 grams (72.6% of theory), M.P. 172 to 176° C.

The elemental analysis of the 2,4-dinitrophenylhydrazone of glutaraldehyde monooxime of the formula

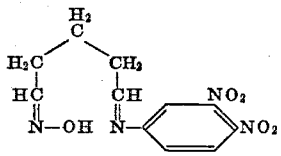

was as follows

| | Percent | | |
|---|---|---|---|
| | C | H | N |
| Calculated | 44.58 | 4.73 | 23.63 |
| Found | 45.10 | 3.85 | 23.70 |

11.5 grams (0.1 mole) of the glutaraldehyde monooxime were suspended in 100 ml. of water and a solution of 6.95 grams of hydroxylamine hydrochloride in 50 ml. of water were added thereto with powerful stirring.

The conversion of the monooxime to the dioxime of glutaraldehyde took place with partial solution and reprecipitation. The hydrochloric acid set free thereby was neutralized with 99.5 ml. of 1 N sodium hydroxide, which corresponds to an almost 100% conversion. After standing overnight the crystalline product was filtered off with suction, washed and dried. There were obtained 11.5 grams of glutaraldehyde dioxime with a melting point of 174 to 177° C., this amounted to 85% of theory.

IR spectrum and analytical values agreed with those of a dioxime produced from glutaraldehyde and excess hydroxylamine.

| | Percent | | |
|---|---|---|---|
| | C | H | N |
| Calculated | 46.2 | 7.69 | 21.5 |
| Found | 46.65 | 7.42 | 21.91 |

In place of 2-ethoxy-3,4-dihydropyrane (to make glutaraldehyde monooxime) there can be employed 2-ethoxy-4-methyl-3,4-dihydro-1,2-pyrane, 2-methoxy-5-methyl - 3,4-dihydro-1,2-pyrane, 2-methoxy - 6 - methyl-3,4-dihydro-1,2-pyrane, to prepare the corresponding alpha methyl-glutaraldehyde monooxime, beta methyl glutaraldehyde monooxime and gamma methyl glutaraldehyde monooxime.

What is claimed is:
1. A compound having the formula

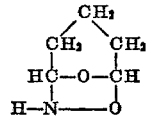

References Cited
FOREIGN PATENTS
734,381  7/1955  England.

DONALD G. DAUS, Primary Examiner
R. V. RUSH, Assistant Examiner

U.S. Cl. X.R.

260—290 P, 465.1, 465.4, 465.6, 482 R, 561 A, 566 A, 999